(No Model.)

E. G. BRUNER.
OIL CAN HOLDER.

No. 370,004. Patented Sept. 13, 1887.

WITNESSES:
George Binkenburg
C. Sedgwick

INVENTOR:
E. G. Bruner
BY Munn & Co.
ATTORNEYS.

UNITED STATES PATENT OFFICE.

EDGAR G. BRUNER, OF WEST POINT, NEBRASKA.

OIL-CAN HOLDER.

SPECIFICATION forming part of Letters Patent No. 370,004, dated September 13, 1887.

Application filed February 10, 1887. Serial No. 227,122. (No model.)

*To all whom it may concern:*

Be it known that I, EDGAR G. BRUNER, of West Point, in the county of Cuming and State of Nebraska, have invented a new and useful Improvement in Oil-Can Holders, of which the following is a full, clear, and exact description.

My invention relates to devices for lubricating machinery; and its objects are to provide means by which parts thereof not easily or without danger oiled by hand—cranes, machinery on windmill-towers or so situated as to be accessible only by ladders or stairs, and parts of locomotives or other engines which cannot be reached except by creeping underneath the engine—may be readily lubricated, whether in action or at rest.

It consists of a cup for holding an oil-can, provided with an elongated handle, and rods for holding and adjusting said cup.

Reference is to be had to the accompanying drawings, forming a part of this specification, in which similar letters of reference indicate corresponding parts in all the figures.

Figure 1:
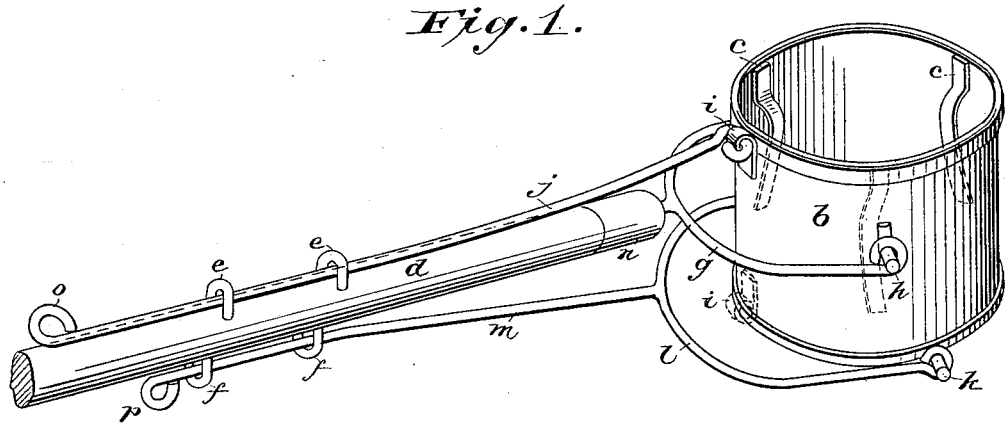
Figure 2:
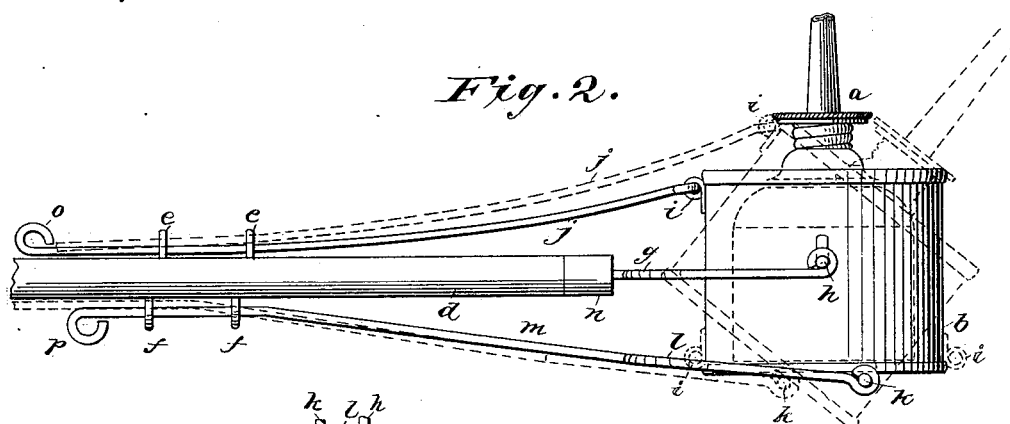
Figure 3:
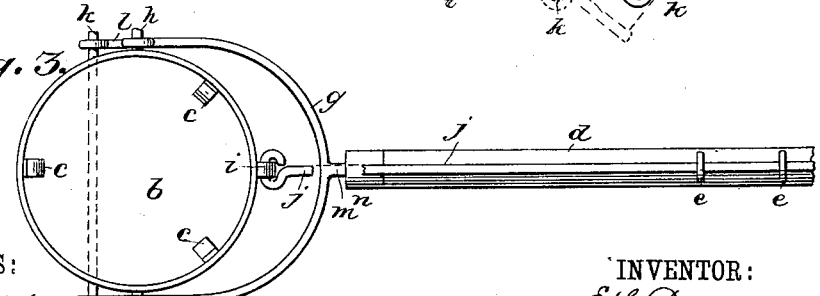

Figure 1 is a perspective view of my improved oil-can holder, showing the cup, its internal retaining-springs, its handle, and its adjusting-rods. Fig. 2 is a side elevation of the same, showing the oil-can therein, also showing the cup and can tilted outward from the handle. Fig. 3 is a plan view of the same, the oil-can being removed.

Referring to said drawings, $a$ is the oil-can.

$b$ is the cup, and $c\ c$ are retaining-springs therein.

$d$ is the handle. $e\ e$ and $f\ f$ are screw-eyes or staples thereon, and $g$ is a yoke in the end of the handle.

$h\ h$ are bearings in the sides of the cup.

$i$ is an eye at the rear of its rim, and $j$ is a slide-rod connected to said eye.

$k$ is a rod secured beneath the bottom of the cup, its ends affording bearings for the yoke $l$ on the end of the slide-rod $m$.

$n$ is a ferrule on the end of the handle $d$, and $o\ p$ are stops on the rods $j$ and $m$.

The cup $b$ is constructed of a diameter and height to accommodate the size and form of the oil-can to be used. At the center of its sides are secured in any suitable manner bearings $h$. At the rear of its rim, and also at the front and rear of its bottom edge, if desired, is secured in any suitable manner an eye, $i$. To the under surface of the cup, and slightly forward of the centers of the bearings $h$, is secured in any suitable manner the rod $k$, the ends of which project outward from the bottom of the cup; or, if desired, bearings similar to those at the sides of the cup may be secured in the same manner to the rim of the cup or to its bottom edge. The interior of the cup is furnished with parallel convex retaining-springs $c$, their upper ends being fastened near the upper edge thereof, their lower ends being free, or their lower ends may be secured and their upper ends be free.

The handle $d$ is constructed either straight or curved, of such a length as may be necessary to reach the particular parts or situation of the machinery to be oiled, and in its end is inserted the stem of the yoke $g$, said end being prevented from splitting by the presence of the ferrule $n$. Said handle $d$ has inserted in its top and bottom, respectively, screw eyes or staples $e$ and $f$.

The slide-rod $j$ is passed through the staples $e$, is attached to the eye $i$, and its free end is turned over upon its body to form the stop $o$. The slide-bar $m$ has a yoke, $l$, rigidly secured to its outer end. Said rod $m$ is passed through the staples $f$, and its free end is turned over upon its body to form the stop $p$.

The yoke $g$ is attached to the bearings $h$ and the yoke $l$ to the ends of the rod $k$. The bearings for the yoke $l$ being situated slightly forward of the center of the bearings $h$ enables the cup $b$ to be canted over in line with the handle $d$.

The oil-can $a$ is inserted in the cup $b$, the springs $c$ holding it therein and preventing its displacement when the cup is canted or even completely reversed. The rods $j$ and $m$ have free lateral play along the handle in the staples $e$ and $f$. The cup is prevented from tilting forward or back by grasping the handle and confining the rods upon and against it. The cup is then held in the position indicated by the solid lines in the drawings. It may be tilted forward from the end of the handle by either pushing the rod $j$ forward, causing the rod $m$ to move backward, or by pulling the rod $m$ backward, causing the rod $j$ to move forward. In either case the cup turns freely on its bearings $h$ in the arms of the yoke $g$ and the ends of the rod $k$ turn freely in the arms of the yoke $l$, causing the cup to stand diagonally, as indicated by the broken lines in Fig. 2, or the rods $j$ or $m$ being further pushed forward and drawn backward, respectively, causing it to stand in a direct line with the handle $d$. Said cup may be caused to tilt backward toward the end of the handle by either pulling the rod $j$ backward, causing the rod $m$ to move forward, or pushing the rod $m$ forward, causing the rod $j$ to move backward. In either case the cup turns in the yokes $g$ and $l$ as freely as when it is tilted forward. The stops $o$ and $p$ prevent the rods $j$ and $m$ from slipping out of the staples $e$ and $f$.

By the use of my invention the same oil-can which is employed for the lubrication of the easily-accessible parts or machinery may be availed of for oiling such parts or machinery as are elevated beyond the ordinary reach of the oiler, which are beneath the machine, or to which direct access is not obtainable except by creeping beneath the machine.

Where elevated parts or machinery are to be oiled, my invention renders the climbing of ladders or stairways unnecessary and enables the work to be performed at a great saving of time and diminution of labor, while the oiling of parts beneath the machine may be conducted quickly and efficiently without endangering the life or person of the workman, and the oiling may be done whether the machinery is at rest or in operation, as well in the one case as in the other.

My invention is simple in its construction and operation, is inexpensive to manufacture, is readily applied to any oil-can from which the lubricating-oil passes by its own gravity when the can is disturbed from a perpendicular, and enables the can to be turned so as to discharge its contents in any desired direction.

By providing eyes at the front and rear of the bottom edge of the cup and bearings at the sides of its rim for the yoke of the rod $m$ and lengthening the rod $j$, the rods $m$ and $j$ may be placed as shown in the drawings, or be displaced the one by the other, and either one or both of said rods may be applied to the handle and cup, as desired.

Having thus described my invention, what I claim as new, and desire to secure by Letters Patent, is—

1. In an oil-can holder, the combination of the cup $b$, provided with internal retaining-springs, $c$, central bearings, $h$, in its sides, and an eye, $i$, projecting from the rear of its rim, with the handle $d$, having staples $e$ on its upper side and carrying the yoke $g$, connected to said bearings, and the rod $j$, sliding in said staples and connected to the eye $i$, substantially as shown and described.

2. In an oil-can holder, the combination of the cup $b$, provided with internal retaining-springs, $c$, central bearings, $h$, in its sides, and a rod, $k$, secured beneath its bottom and forward of said bearings $h$, with the handle $d$, having staples $f$ on its under side, and carrying the yoke $g$, connected to said bearings, and the rod $m$, sliding in said staples and provided with a yoke, $l$, connected to the ends of the rod $k$, substantially as shown and described.

3. In an oil-can holder, the combination of the handle $d$, carrying the yoke $g$, and the rods $j$ $m$, sliding in staples $e f$ on said handle, with the cup $b$, provided with internal retaining springs or catches, $c$, central bearings, $h$, in its sides, an eye, $i$, projecting from the rear of its rim, and a rod, $k$, secured beneath its bottom forward of said bearings $h$, said yoke $g$ and rod $j$ being respectively connected to the bearings $h$ and said eye $i$, and the rod $m$ being connected by its yoke $l$ to the ends of the rod $k$, substantially as shown and described.

4. An oil-can holder consisting of a cylindrical cup, means for detachably retaining an oil-can in said cup, a handle carrying a yoke connected to central bearings in the sides of said cup, a rod adapted to slide in suitable guides on the handle and to be connected to an eye projecting from the rear of the cup, a rod adapted to slide in suitable guides on the handle and carrying a yoke adapted to be connected to bearings at the sides of the cup forward of the bearings for the yoke carried by the handle, all constructed substantially as shown and described, and for the purposes set forth.

EDGAR G. BRUNER.

Witnesses:
　THOS. KING,
　HUDSON F. BRUNER.